(12) United States Patent
Tseng

(10) Patent No.: US 9,493,146 B1
(45) Date of Patent: Nov. 15, 2016

(54) BRAKE-AIDING DEVICE

(71) Applicant: ANSURE, INC., New Taipei (TW)

(72) Inventor: Ton-Rong Tseng, New Taipei (TW)

(73) Assignee: ANSURE, INC., New Taipei (TW)

( * ) Notice: Subject to any disclaimer, the term of this patent is extended or adjusted under 35 U.S.C. 154(b) by 0 days.

(21) Appl. No.: 14/811,136

(22) Filed: Jul. 28, 2015

(51) Int. Cl.
*B62L 3/08* (2006.01)
*B60T 11/06* (2006.01)
*B60T 11/04* (2006.01)
*B60T 7/10* (2006.01)

(52) U.S. Cl.
CPC ............... *B60T 11/06* (2013.01); *B60T 7/102* (2013.01); *B60T 11/046* (2013.01)

(58) Field of Classification Search
CPC ......... B60T 11/06; B60T 11/046; B62L 3/08
USPC ............................ 188/2 D, 24.16, 24.22, 344
See application file for complete search history.

(56) References Cited

U.S. PATENT DOCUMENTS

| | | | | |
|---|---|---|---|---|
| 6,634,467 B2 * | 10/2003 | Liu | ...................... | B60T 11/046 188/2 D |
| 8,261,887 B2 * | 9/2012 | Tseng | ...................... | B60T 11/06 188/2 D |
| 8,469,156 B2 * | 6/2013 | Lu | ............................ | B62L 3/08 188/2 D |
| 9,227,693 B2 * | 1/2016 | Tseng | ........................ | B62L 3/08 |
| 2015/0197310 A1 * | 7/2015 | Tseng | ........................ | B62L 3/08 188/344 |

* cited by examiner

*Primary Examiner* — Christopher Schwartz
(74) *Attorney, Agent, or Firm* — Rabin & Berdo, P.C.

(57) ABSTRACT

A brake-aiding device includes a casing and a drive mechanism installed in the casing. The drive mechanism has a revolving axle, and first revolver, a second revolver and a driven revolver that rotate against the revolving axle. The driven revolver has at least one propping portion for providing unidirectional stop to the first revolver and the second revolver. When brake lever cables of a two-wheeled vehicle are connected to the first and second revolver, and front- and rear-wheel brake cables of the vehicle are connected to the driven revolver, by operating either of the vehicle's left and right brake levers, both of the vehicle's front and rear wheels are braked. During the braking, the rear wheel is brakes before the front wheel is brakes, and a braking force at the rear wheel keeps greater than a braking force at the front wheel braking force.

17 Claims, 11 Drawing Sheets

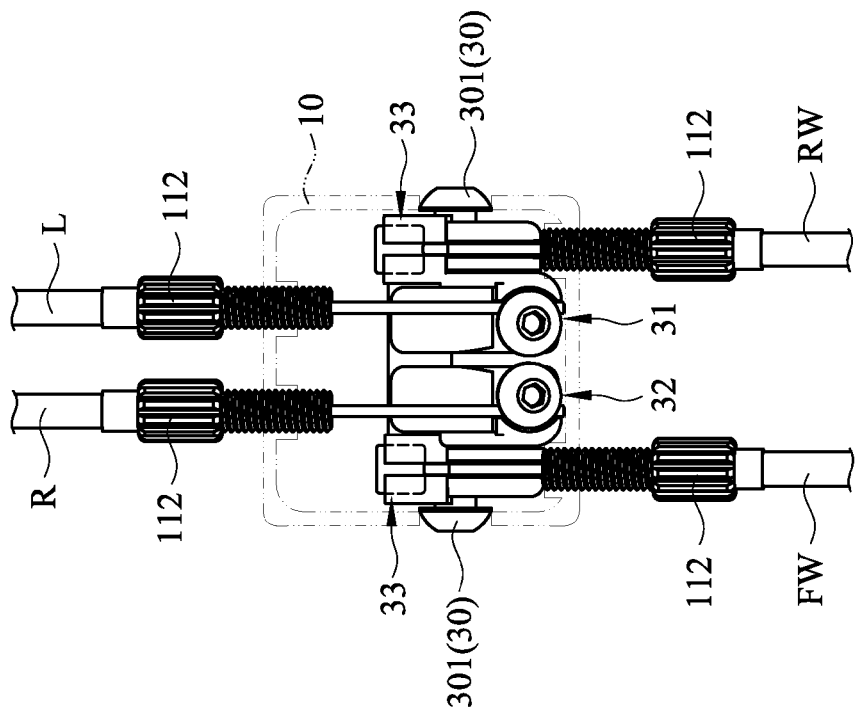
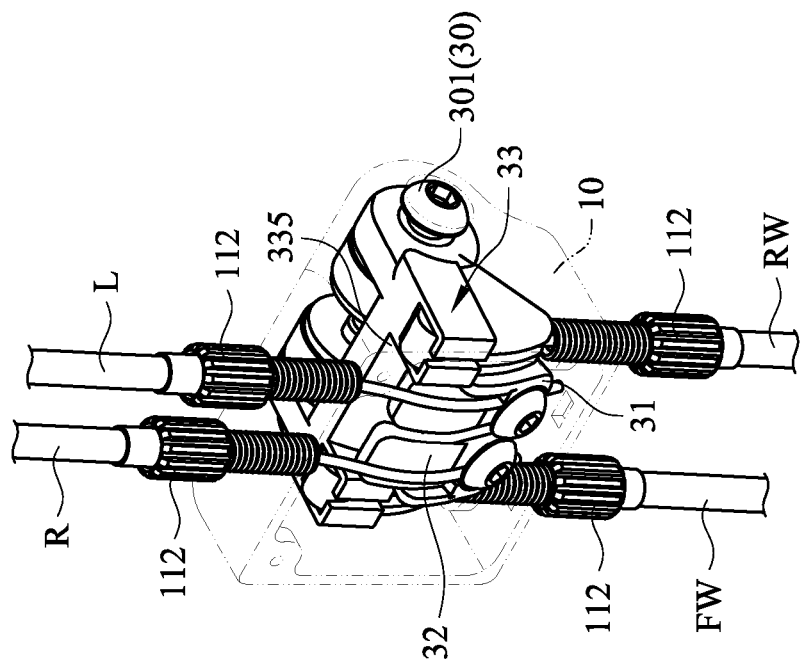

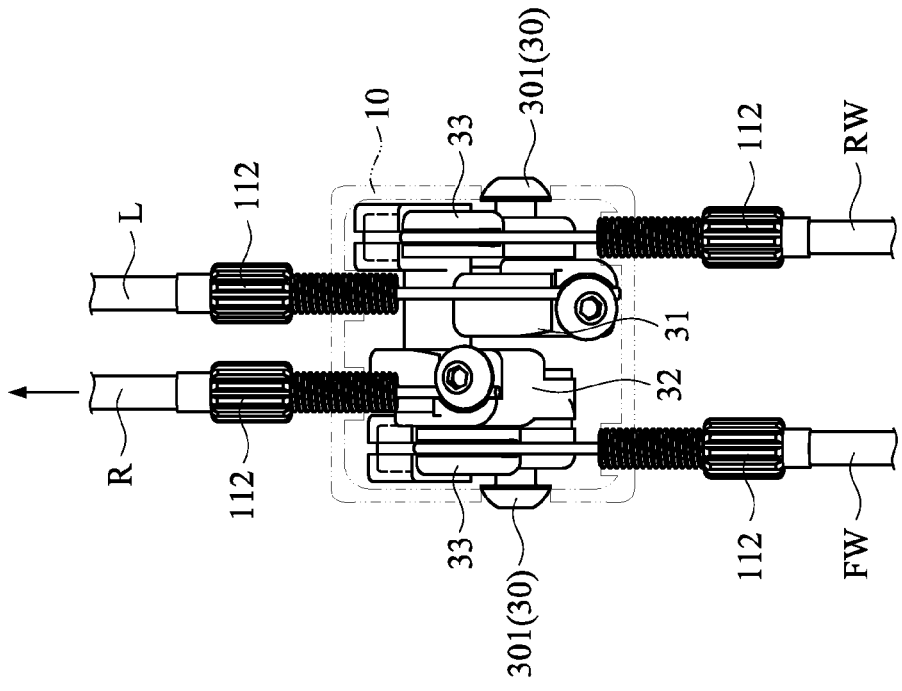
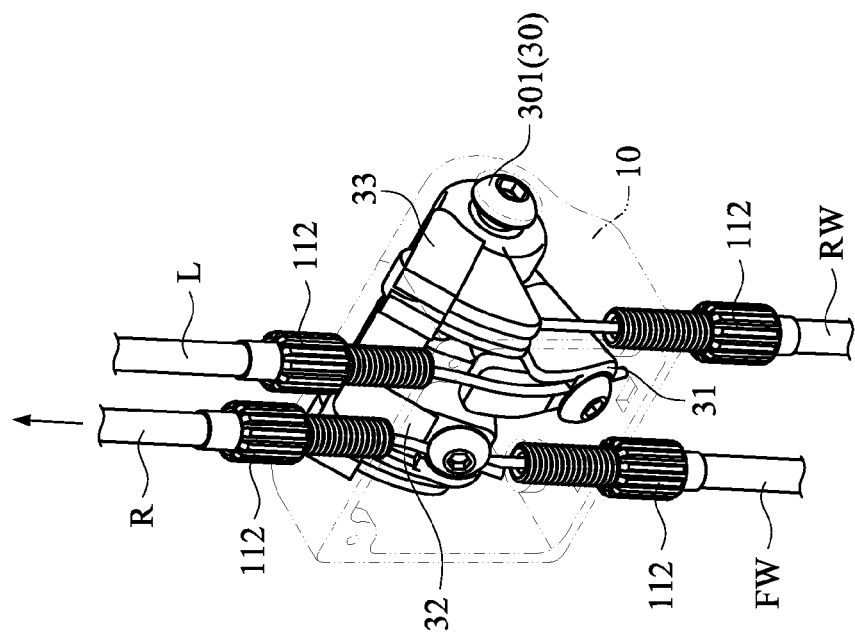
FIG. 4a
FIG. 4b

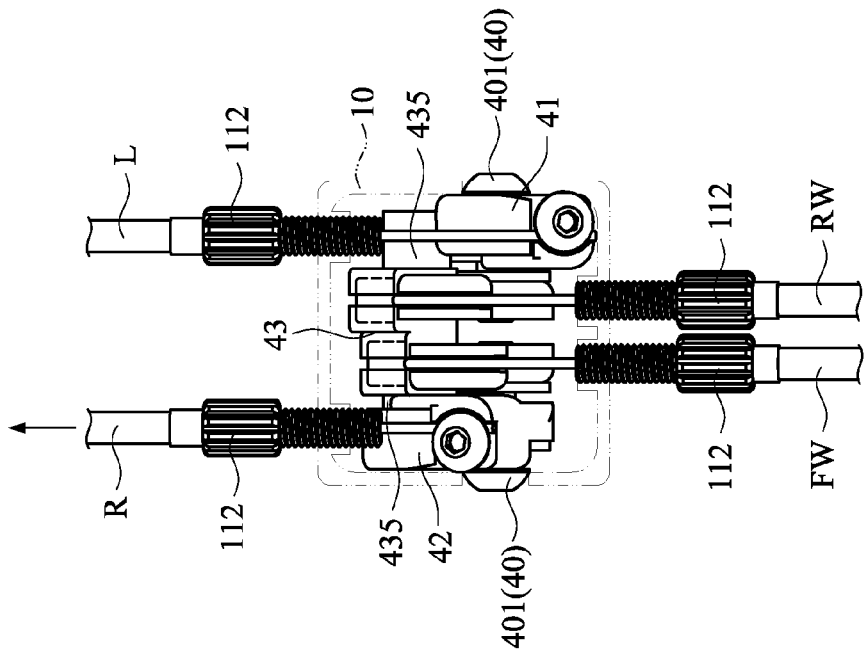
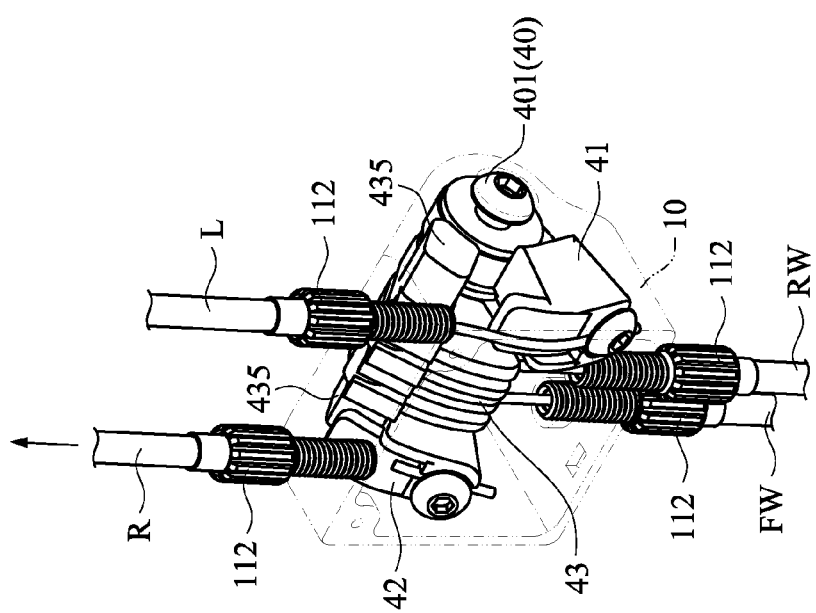
FIG. 8a
FIG. 8b

BRAKE-AIDING DEVICE

BACKGROUND OF THE INVENTION

1. Technical Field

The present invention relates to transmissions used in brakes of two-wheeled vehicles, and more particularly to a brake-aiding device that is capable of applying synchronously front- and rear-wheel brakes and controlling brake strength.

2. Description of Related Art

Pull-out handbrake systems are widely seen in general two-wheel vehicles, such as bicycles, motorcycles, and electric motorcycles. Such a system includes two brake levers attached to the bike's left and right handles, respectively. The brake levers are connected to the bike's front-wheel brake and rear-wheel brake respectively through brake cables so that braking the bike's front and rear wheels can be achieved by pulling the brake levers. It is to be noted that braking, which brings about deceleration, is realized when friction is developed between the wheel tires and the ground. During advance of a two-wheel vehicle (such as a bicycle or any of various motorcycles), the vehicle and its rider both maintain a forward inertial force. In the event that braking is applied improperly, skid and even rollover tend to happen. Particularly, a rider in emergency can usually squeeze the brake levers to the end spontaneously. In this case, if the rear wheel is locked by the brake, and the friction developed between the tire and the ground is insufficient to stop the vehicle, skid or shift can happen. On the other hand, if it is the front wheel that gets stuck, the vehicle can roll over due to inertia. Therefore, the order and the force for a rider to apply brakes are more than important.

As known to most bike riders, the recommended way to brake for preventing accidents caused by improper braking is first braking the rear wheel and then braking the front wheel, with 70% braking force generated from the rear wheel and 30% generated from the front wheel. There are brake devices that are designed to use a single brake lever to control the front- and rear-wheel brakes synchronously. However, these devices are bulky and heavy, making them unfavorable to the appearance and structural balance of the bicycles having them and come against the trend toward light-weight bicycles. In view of these facts, the present invention is made on the basis of the inventor's years of experience and herein disclosed for patent protection.

SUMMARY OF THE INVENTION

The primary objective of the present invention is to provide a brake-aiding device that uses linked revolvers to brake both of a two-wheeled vehicle's front and rear wheels by operating either of the vehicle's left or right brake lever, wherein the rear wheel is braked first and then the front wheel is braked, so as to ensure safe braking and prevent accidents.

Another objective of the present invention is to provide a brake-aiding device that maintains the braking force generated at the rear wheel greater than that generated at the front wheel in virtue of the designed distances from the front- and rear-wheel brake cables to axle of the revolvers, so as to ensure safe braking.

Still another objective of the present invention is to provide a brake-aiding device that is compact, light and simple to install due to its three-dimensional structure and linked revolvers, so the use of the brake-aiding device is easy and convenient.

To achieve the foregoing objectives, the technical means employed by the present invention is to provide a brake-aiding device applicable to a two-wheeled vehicle. The brake-aiding device comprises a hollow casing and a drive mechanism installed therein. The drive mechanism comprises a revolving axle transversely provided near a rear end of the casing, and a first revolver, a second revolver, and a driven revolver that all three are configured to rotate against the revolving axle. The first revolver, the second revolver, and the driven revolver each have a rear segment mounted around the revolving axle, so that front segments of the first revolver, the second revolver, and the driven revolver are allowed to move up and down inside the casing within a predetermined range. The driven revolver has at least one propping portion for providing forward or backward stop to the first revolver and the second revolver, so that when any of the first revolver and the second revolver rotates forward or backward, the driven revolver is driven to rotate.

Preferably, the first revolver is placed next to the second revolver, and the driven revolver comprises two rotating portions and the propping portion, in which the two rotating portions jointly flank the first revolver and the second revolver, and the propping portion spans the first revolver and the second revolver and connects the two rotating portions.

Preferably, the first revolver and the second revolver flank the driven revolver, and the driven revolver has the propping portions provided at two lateral sides thereof to provide stop to the first revolver and the second revolver.

Preferably, the front segments of the first revolver and the second revolver are for cables of two brake levers of the two-wheeled vehicle to connect, and the front segment of the driven revolver is for cables of front- and rear-wheel brakes of the two-wheeled vehicle to connect.

Preferably, a distance between where the driven revolver connects the front-wheel brake cable and the axle is smaller than a distance between where the driven revolver connects the rear-wheel brake cable and the axle.

Preferably, the casing has a top and a bottom each provided with two through holes, and the cables of the two brake levers and the cables to the two brakes are connected to the drive mechanism from the top and bottom of the casing through the through holes.

Preferably, the driven revolver further comprises two collars and two grooves for positioning the cables.

Preferably, the revolving axle is formed by two shafts that are coaxial and pass through two lateral sides of the casing.

Preferably, the first revolver, the second revolver, and the driven revolver are mounted around the revolving axle through bushes.

Preferably, the casing comprises a casing body and a front cover that are configured to combine with each other.

Thereby, the disclosed brake-aiding device can provide the benefits of ensuring safe braking, properly distributing braking forces, and being compact and lightweight. In addition, since the first revolver and the second revolver are operated independently by their respective corresponding brake levers, the cables can be effectively prevented from malfunction. For example, when the first revolver is driven, it only drives the driven revolver to rotate but not the second revolver. This helps to prevent the cable of one of the brake levers from coming off when only the other brake lever is operated. Similarly, when the second revolver is driven, it does not drive the first revolver to rotate. Thereby, a brake system integrating the disclosed brake-aiding device can have the cables operating more smoothly, stably and durably.

The invention as well as a preferred mode of use, further objectives and advantages thereof will be best understood by reference to the following detailed description of illustrative embodiments when read in conjunction with the accompanying drawings

BRIEF DESCRIPTION OF THE DRAWINGS

FIG. 3a and FIG. 3b depict the brake-aiding device of the first embodiment of the present invention that is not activated.

FIG. 4a and FIG. 4b depict the brake-aiding device of the first embodiment of the present invention with its right brake lever activated.

FIG. 8a and FIG. 8b depict the brake-aiding device of the second embodiment of the present invention with its right brake lever activated.

DETAILED DESCRIPTION OF THE INVENTION

Figure 1:
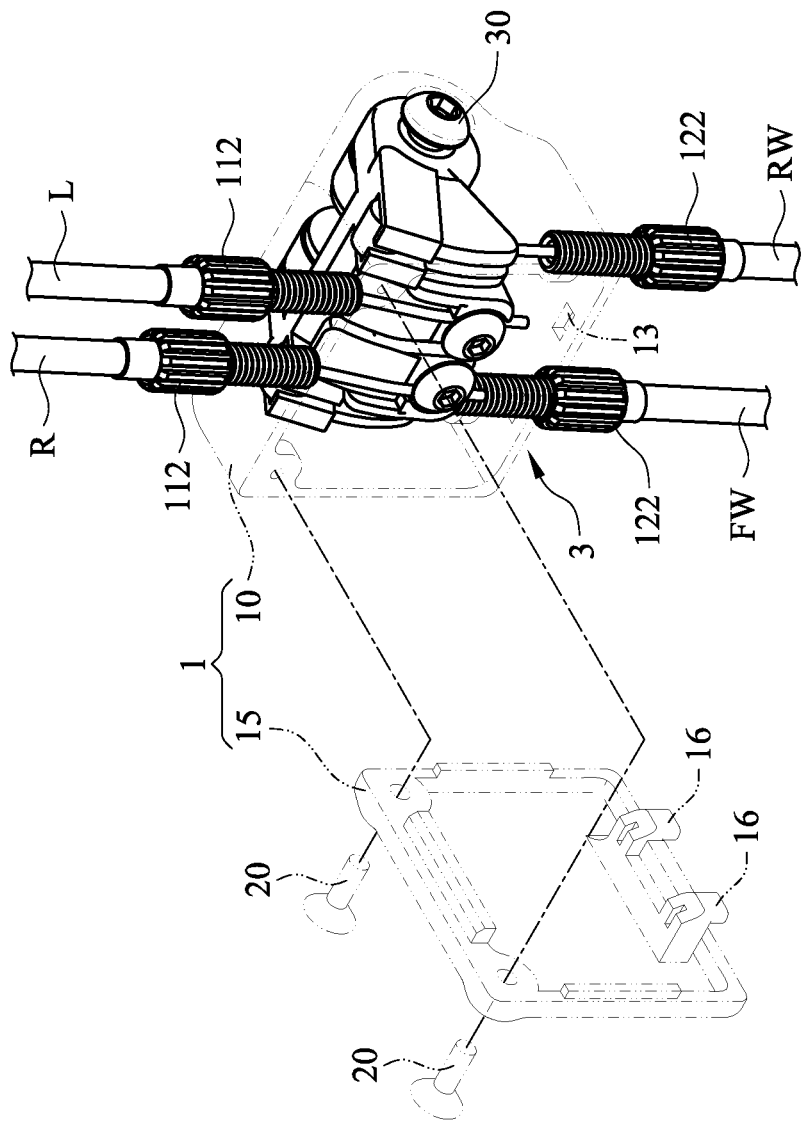
FIG. 1 is a perspective view of the brake-aiding device of the first embodiment of the present invention with its casing removed.
Figure 2A:
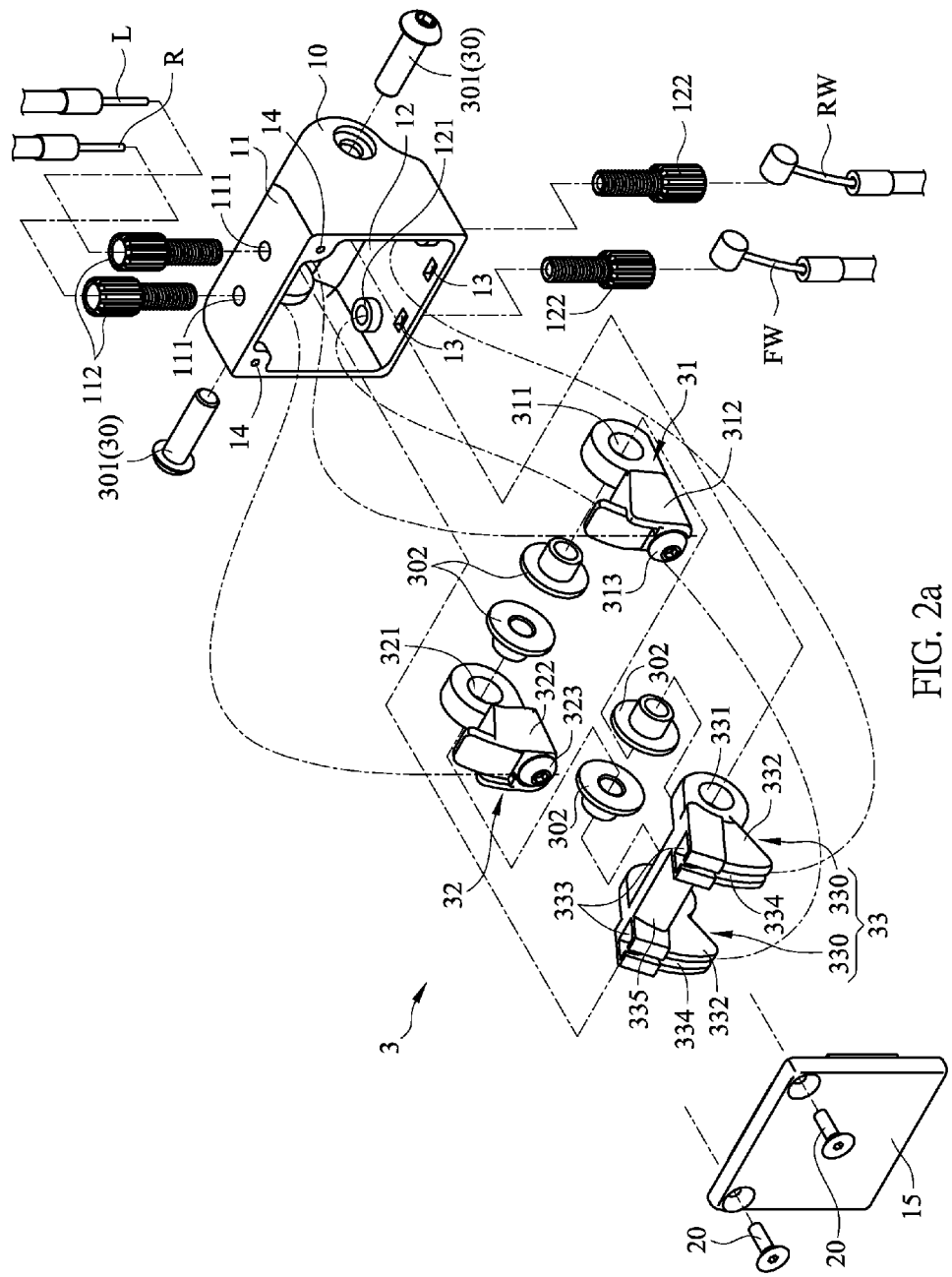
FIG. 2a is an exploded view of the brake-aiding device of the first embodiment of the present invention.

Referring to FIG. 1 and FIG. 2a, in the first embodiment of the present invention, a brake-aiding device primarily comprises a hollow casing 1 and a drive mechanism 3 installed therein.

The casing 1 is mainly composed of a casing body 10 and a front cover 15. The casing body 10 is of a three-dimensional hollow structure that has a forward-facing opening and a front cover 15 covering the opening. When the front cover 15 combined with the casing body 10, the opening is closed. The casing body 10 comprises mortise 13 formed at its bottom 12 near the opening for fittingly receiving and thus positioning tenons 16 corresponding formed on the front cover 15. Fixing holes 14 are provided on the casing body 10 above the opening so that fixing members 20 can be screws thereinto to fix the front cover 15 to the casing body 10, thereby forming the closed casing 1. The casing body 10 has a top 11 and the bottom 12, each of which is provided with two through holes 111 or 121. In the through holes 111, 121, guiding sleeves 112, 122 each allowing a cable to smoothly pass therethrough are inserted.

The drive mechanism 3 is installed in the casing 1, and primarily comprises a revolving axle 30, as well as a first revolver 31, a second revolver 32 and a driven revolver 33 that are mounted around the revolving axle 30. The revolving axle 30 is located near the rear end (or inner end, opposite to the end having the opening) of the casing body 10. In the present embodiment, the revolving axle 30 may be composed of two shafts 301 that are coaxial and fixed at two lateral sides of the casing body 10, respectively.

The first revolver 31 comprises a front segment and a rear segment that are mutually connected. The rear segment has an axial hole 311 for receiving the revolving axle 30, and the front segment is a moving portion 312 that is allowed to rotate against the revolving axle 30. The second revolver 32 is placed next to the first revolver 31, and also comprises a front segment and a rear segment that are mutually connected. The rear segment has an axial hole 321 for receiving the revolving axle 30, and the front segment is a moving portion 322 that is allowed to rotate against the revolving axle 30. The driven revolver 33 comprises two rotating portions 330 and a propping portion 335. The two rotating portions 330 jointly flank the first revolver 31 and the second revolver 32. Each of the rotating portions 330 similarly comprises a front segment and a rear segment that are mutually connected. The rear segment has an axial hole 331 for receiving the revolving axle 30, and the front segment is a moving portion 332 that is allowed to rotate against the revolving axle 30. The propping portion 335 is located on the first revolver 31 and the second revolver 32 for connecting the two rotating portions 330. The propping portion 335 together with the first revolver 31 and the second revolver 32 forms a stopper. Since the propping portion 335 connects the two rotating portions 330, the two rotating portions 330 are set to rotate in the same direction for the same angle. In addition, since the propping portion 335 is placed on the first revolver 31 and the second revolver 32, when any of the first revolver 31 and the second revolver 32 rotates upward (unidirectional), the propping portion 335 is pushed to make the driven revolver 33 rotate with the first revolver 31 or the second revolver 32.

For wiring the cable, the front cover 15 and the casing body 10 are first disassembled. Then one end of each of left and right brake lever cables L, R (usually its rear end, and in the present embodiment the front ends of the left and right brake lever cables L, R are connected to a bike's left and right brake levers, respectively) is inserted into the guiding sleeve 112 of the casing top 11 and fixed to the moving portion 312 or 322 of the front segment of the first or second revolver 31 or 32 by a fastener 313 or 323. Afterward, one end of each of front- and rear-wheel brake cables FW, RW (usually its rear end, and in the present embodiment the rear ends of the front- and rear-wheel brake cables FW, RW are connected to the bike's front- and rear-wheel brakes, respectively) is fittingly received in the a collar 333 and a groove 334 of the moving portion 332 at the front segment of one of the two rotating portions 330. To wire the cable, its rear end is guided to pass the collar 333, the groove 334, and the guiding sleeve 122 at the casing bottom 12 successively, and drawn further until its front end is fixedly positioned in the collar 333. At last, the front cover 15 is put bake on the opening and the brake-aiding device is ready for use. At this time, no matter whether a rider of the bike presses the left brake lever to drive the left brake cable L to make the first revolver 31 rotate upward, or presses the right brake lever to drive the right brake cable R to make the second revolver 32 rotate upward, the propping portion 335 can drive the driven revolver 33 to rotate together, and in turn pull the front- and rear-wheel brake cable FW, RW to brake the front and rear wheels, thereby ensuring safe braking.

Figure 2C:
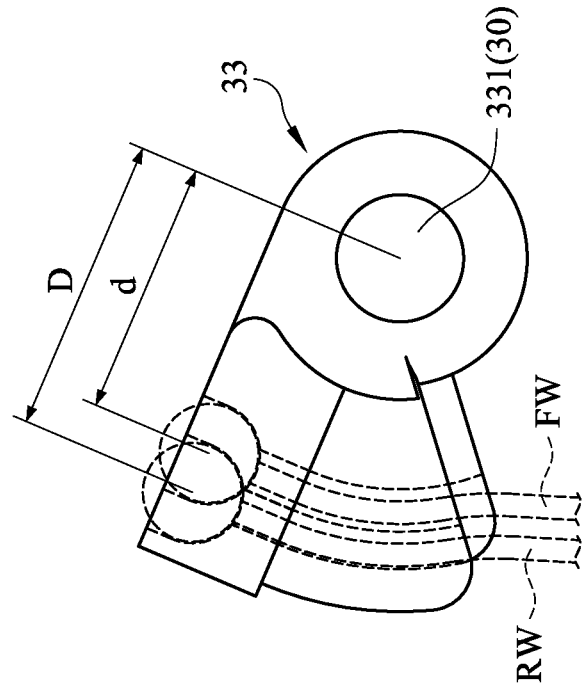
FIG. 2b and FIG. 2c depict a revolver of the brake-aiding device of the first embodiment of the present invention.
Figure 2B:
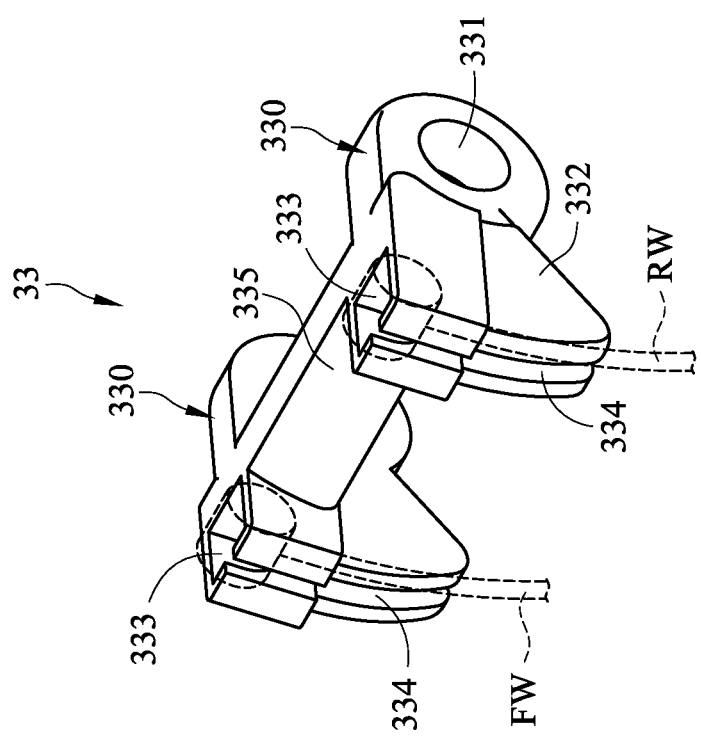

Please also refer to FIG. 2b and FIG. 2c. In one possible embodiment, the two collars 333 formed at the front segment of the two rotating portions 330 may have different distances from the revolving axle 30. The collar 333 separated from the axle by the greater distance D is for fixing the rear-wheel brake cable RW, and the collar 333 separated from the axle by the smaller distance d is for fixing the front-wheel brake cable FW. Thereby, when the driven revolver 33 rotates, the rear-wheel brake cable RW separated from the axle by the greater distance D has its displacement greater than that of the front-wheel brake cable FW separated from the axle by the smaller distance d, so that the front and rear wheel are braked while the rear-wheel braking force keeps greater than the front-wheel braking force.

Figure 5A:
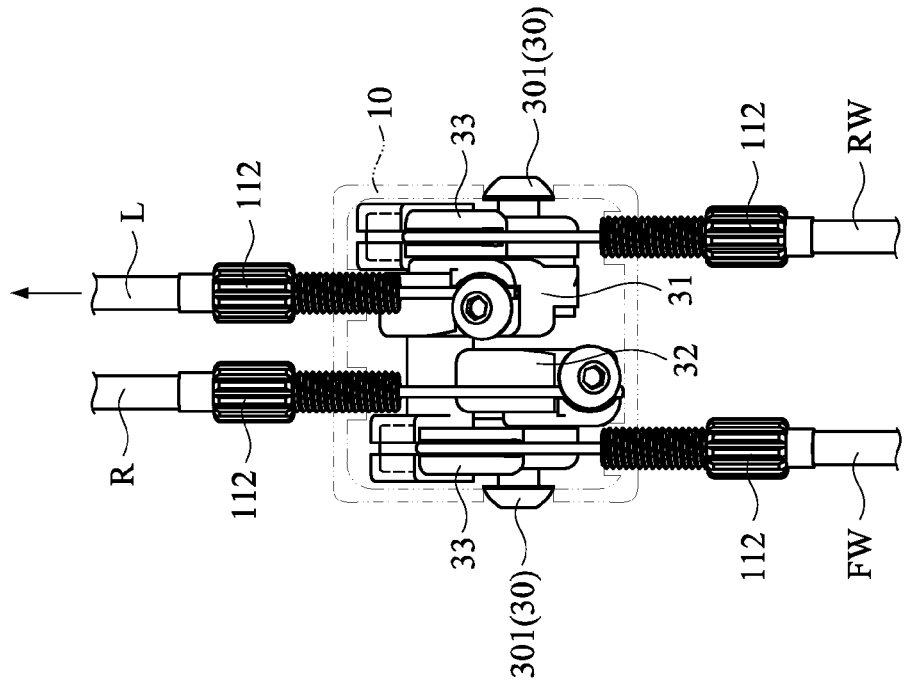
FIG. 5a and FIG. 5b depict the brake-aiding device of the first embodiment of the present invention with its left brake lever activated.
Figure 5B:
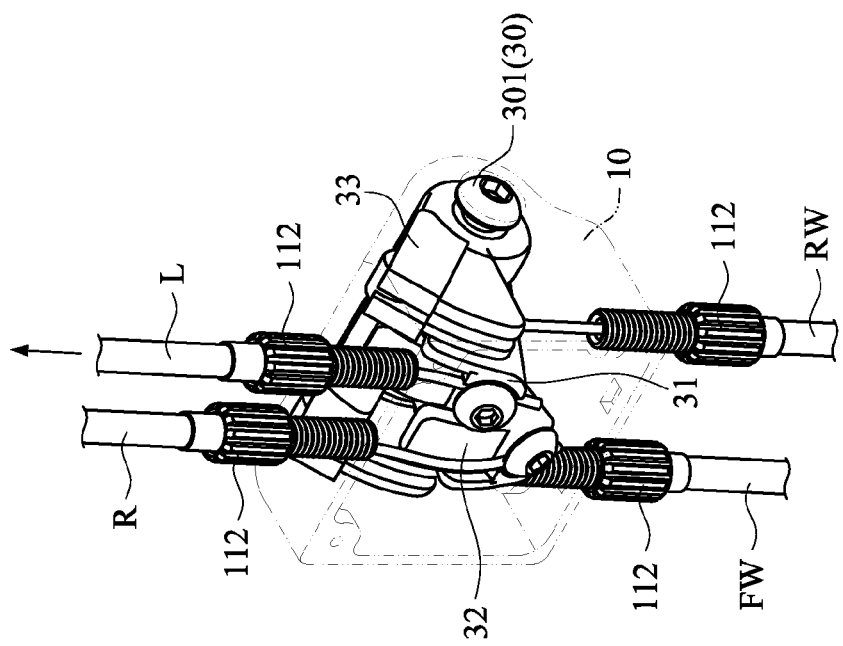

FIG. 3a and FIG. 3b depict the brake-aiding device of the first embodiment of the present invention that is not activated. At this time the first revolver 31 and the second revolver 32 are pushed by the driven revolver 33 and abut against the bottom 12 of the casing body 10. When the rider wants to brake, as shown in FIG. 4a and FIG. 4b, by pressing the right brake lever, the right brake cable R is pulled and rotates upward to drive the second revolver 32 connected therewith to rotate upward. Then since the second revolver 32 abuts against the propping portion 335 of the driven revolver 33, the driven revolver 33 is driven to rotate with the second revolver 32, and pulls the front- and rear-wheel brake cables FW, RW to move upward, thereby braking the front and rear wheels. On the other hand, if the rider presses the left brake lever, as shown in FIG. 5a and FIG. 5b, the left brake cable L is pulled to move upward and drives the first revolver 31 connected therewith to rotate upward. Then since the first revolver 31 abuts against the propping portion 335 of the driven revolver 33, the driven revolver 33 is driven to rotate upward with the first revolver 31, thereby pulling the front- and rear-wheel brake cables FW, RW to move upward, so as to similarly brake the front and rear wheels.

In one possible embodiment, the first revolver 31, the second revolver 32 and the driven revolver 33 each have their rotating portions 310, 320, 330 mounted around the revolving axle 30 through a respective bush 302, so that the distance between the revolvers can be adjusted and the revolvers can rotate against the revolving axle 30 more smoothly and accurately.

It shows the second embodiment of the present invention from FIG. 6a to FIG. 9b. As depicted, the brake-aiding device primarily has a hollow casing 1 and a drive mechanism 4 installed therein. The casing 1 is configured similarly to its counterpart as described in the first embodiment, and needs not to be further explained herein.

The drive mechanism 4 is installed in the casing 1, and primarily comprises a revolving axle 40, as well as a first revolver 41, a second revolver 42 and a driven revolver 43 that are mounted around the revolving axle 40. The revolving axle 40 is located near the rear end (or inner end, opposite to the end having the opening) of the casing body 10. As with the first embodiment, the revolving axle 40 may be composed of two shafts 401 that are coaxial and fixed at two lateral sides of the casing body 10, respectively.

The first revolver 41 comprises a front segment and a rear segment that are mutually connected. The rear segment has an axial hole 411 for receiving the revolving axle 40, and the front segment is a moving portion 412 that is allowed to rotate against the revolving axle 40. The second revolver 42 also comprises a front segment and a rear segment that are mutually connected. The rear segment has an axial hole 421 for receiving the revolving axle 40, and the front segment is a moving portion 422 that is allowed to rotate against the revolving axle 40. The driven revolver 43 located between the first revolver 41 and second revolver 42, and also comprises a front segment and a rear segment that are mutually connected. The rear segment has at least one axial hole 431 for receiving the revolving axle 40, and the front segment may be a moving portion 432 that is allowed to rotate against the revolving axle 40. The driven revolver 43 has its left and right sides each provided with a propping portion 435 for abutting on the first revolver 41 and the second revolver 42 to form stoppers. Thereby, when any of the first revolver 41 and the second revolver 42 rotates upward (unidirectional), the propping portion 435 is pushed to make the driven revolver 43 rotate with the first revolver 41 or the second revolver 42.

For wiring the cable, the front cover 15 and the casing body 10 are first disassembled. Then one end of each of left and right brake lever cables L, R (usually its rear end, and in the present embodiment the front ends of the left and right brake lever cables L, R are connected to a bike's left and right brake levers, respectively) is inserted into the guiding sleeve 112 of the casing top 11 and fixed to the moving portion 412 or 422 of the front segment of the first or second revolver 41 or 42 by a fastener 413 or 423. Afterward, one end of each of front- and rear-wheel brake cables FW, RW (usually its rear end, and in the present embodiment the rear ends of the front- and rear-wheel brake cables FW, RW are connected to the bike's front- and rear-wheel brakes, respectively) is fittingly received in the a collar 433 and a groove 434 of the moving portion 432 at the front segment of one of the driven revolver 43. To wire the cable, its rear end is guided to pass the collar 433, the groove 434, and the guiding sleeve 122 at the casing bottom 12 successively, and drawn further until its front end is fixedly positioned in the collar 433. At last, the front cover 15 is put bake on the opening and the brake-aiding device is ready for use. At this time, no matter whether a rider of the bike presses the left brake lever to drive the left brake cable L to make the first revolver 41 rotate upward, or presses the right brake lever to drive the right brake cable R to make the second revolver 42 rotate upward, the propping portion 435 can drive the driven revolver 43 to rotate together, and in turn pull the front- and rear-wheel brake cable FW, RW to brake the front and rear wheels, thereby ensuring safe braking.

Figure 6A:
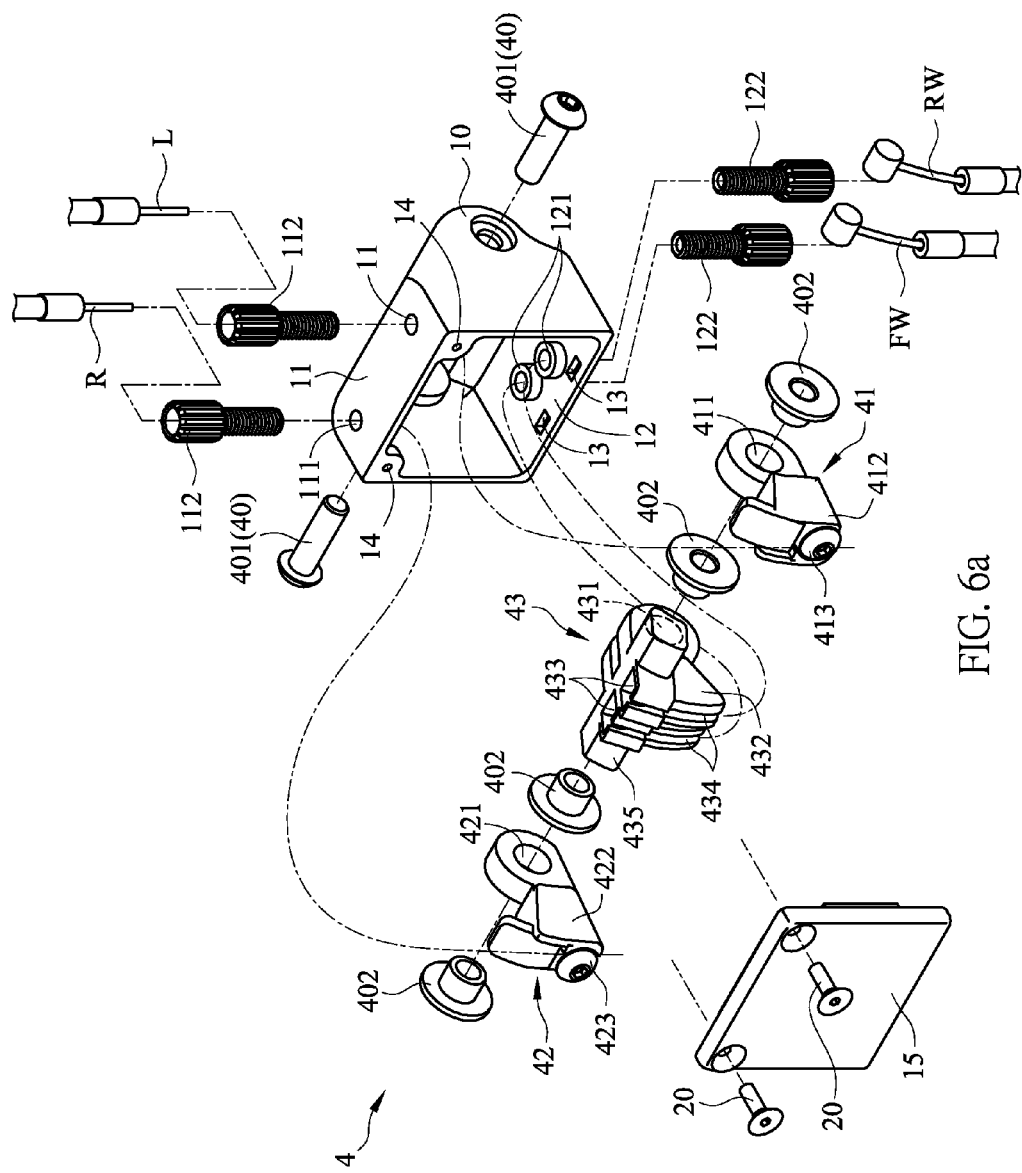
FIG. 6a is an exploded view of the brake-aiding device of the second embodiment of the present invention.
Figure 6C:
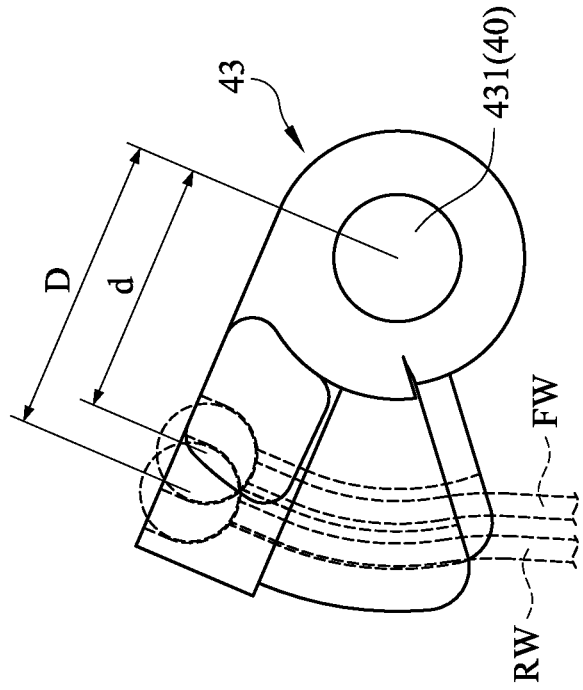
FIG. 6b and FIG. 6c depict a revolver of the brake-aiding device of the second embodiment of the present invention.
Figure 6B:
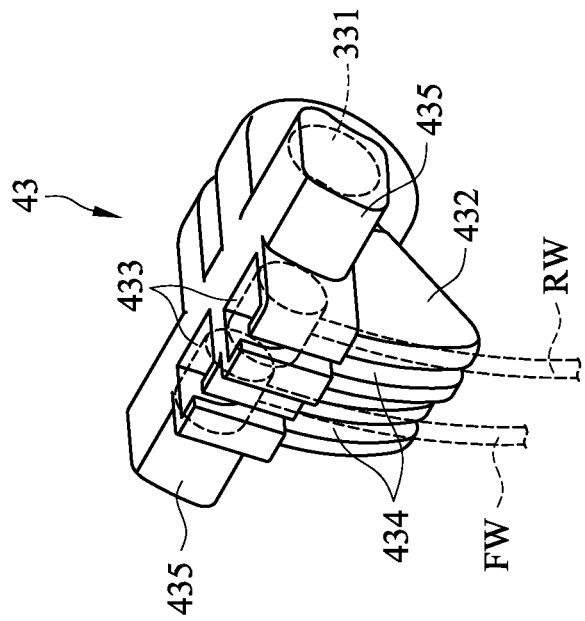

Please also refer to FIG. 6b and FIG. 6c. In one possible embodiment, the two collars 433 formed at the front segment of the driven revolver 43 may have different distances from the revolving axle 40. The collar 433 separated from the axle by the greater distance D is for fixing the rear-wheel brake cable RW, and the collar 433 separated from the axle by the smaller distance d is for fixing the front-wheel brake cable FW. Thereby, when the driven revolver 43 rotates, the rear-wheel brake cable RW separated from the axle by the greater distance D has its displacement greater than that of the front-wheel brake cable FW separated from the axle by the smaller distance d, so that the front and rear wheel are braked while the rear-wheel braking force keeps greater than the front-wheel braking force.

Figure 7A:
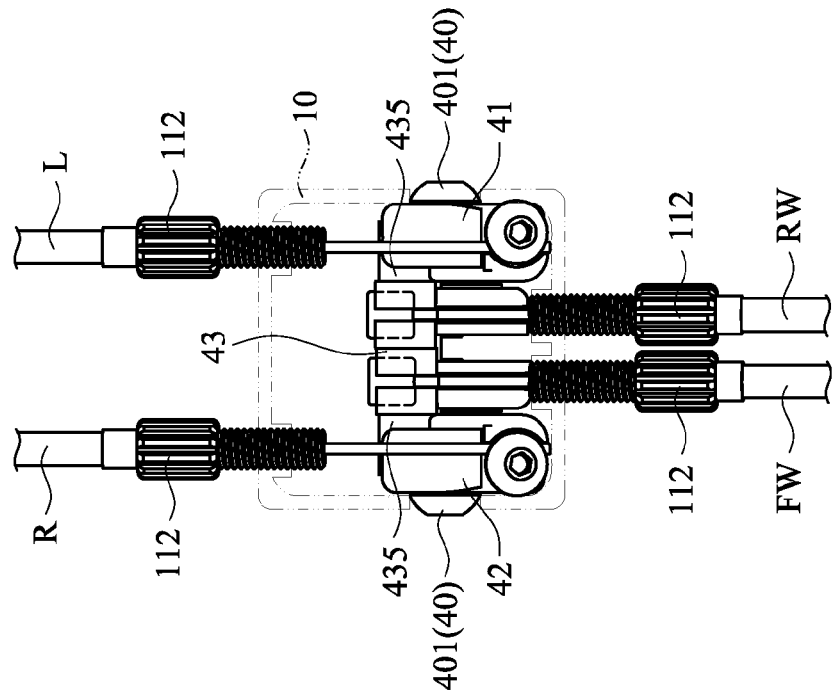
FIG. 7a and FIG. 7b depict the brake-aiding device of the second embodiment of the present invention that is not activated.
Figure 7B:
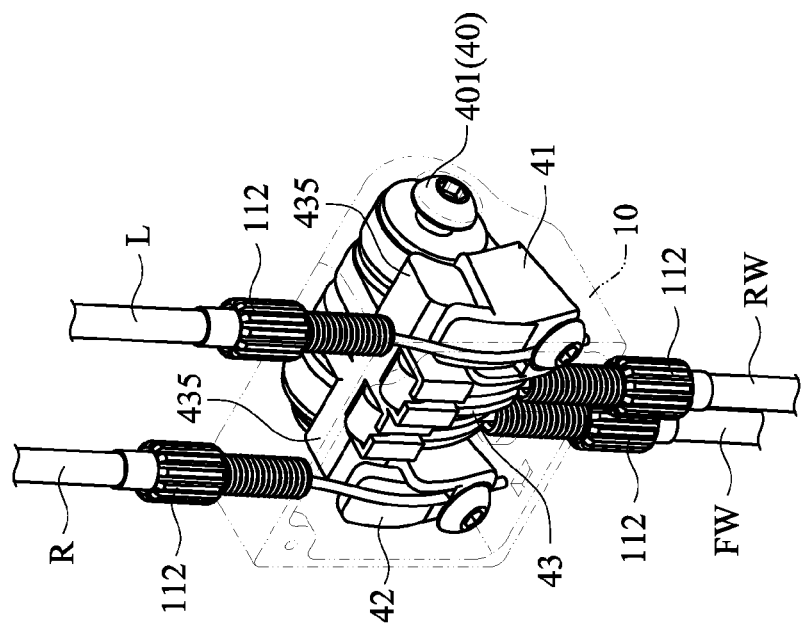
Figures 9A, 9B:
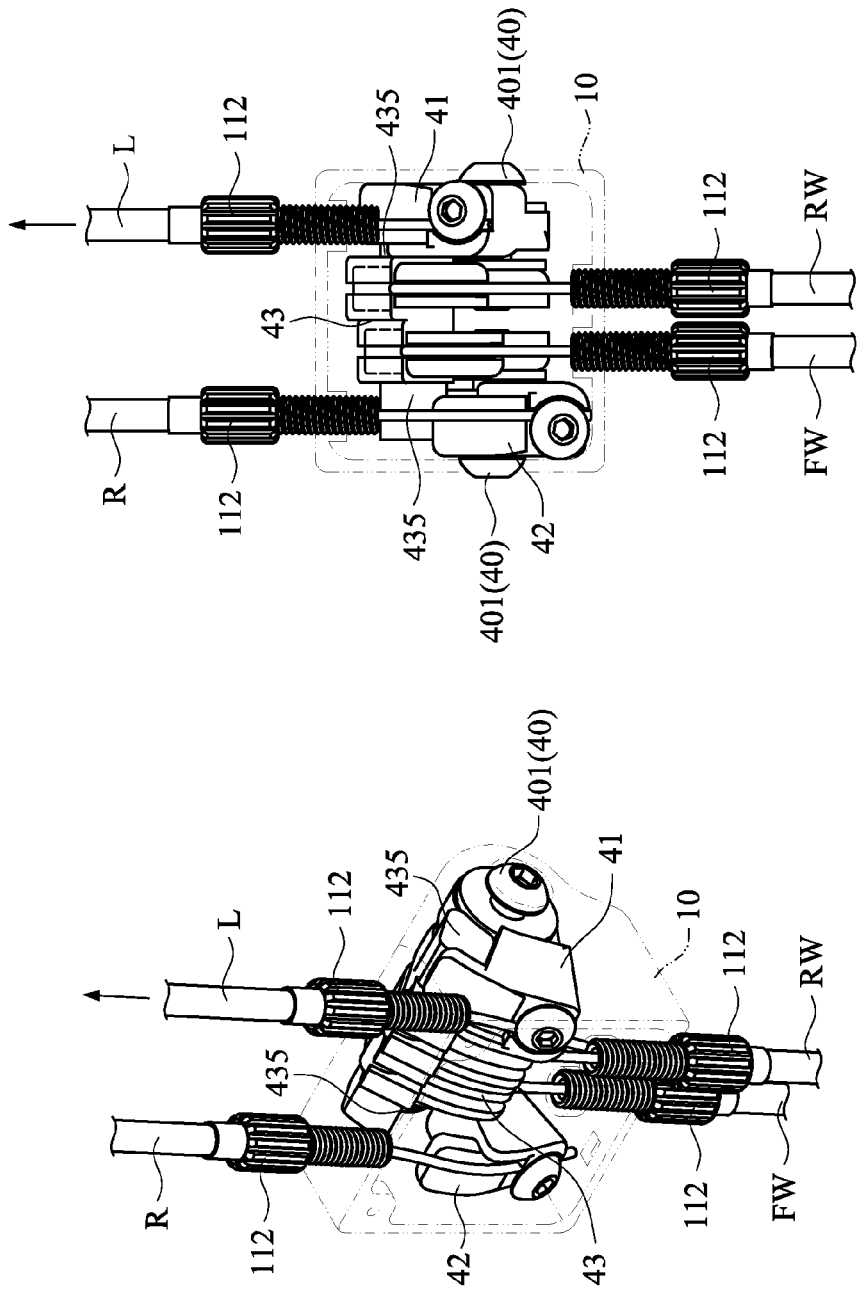
FIG. 9a and FIG. 9b depict the brake-aiding device of the second embodiment of the present invention with its left brake lever activated.

FIG. 7a and FIG. 7b depict the brake-aiding device of the second embodiment of the present invention that is not activated. At this time the first revolver 41 and the second revolver 42 are pushed by the driven revolver 43 and abut against the bottom 12 of the casing body 10. When the rider wants to brake, as shown in FIG. 8a and FIG. 8b, by pressing the right brake lever, the right brake cable R is pulled and rotates upward to drive the second revolver 42 connected therewith to rotate upward. Then since the second revolver 42 abuts against the propping portion 435 of the driven revolver 43, the driven revolver 43 is driven to rotate with the second revolver 42, and pulls the front- and rear-wheel brake cables FW, RW to move upward, thereby braking the front and rear wheels. On the other hand, if the rider presses the left brake lever, as shown in FIG. 9a and FIG. 9b, the left brake cable L is pulled to move upward and drives the first revolver 41 connected therewith to rotate upward. Then since the first revolver 41 abuts against the propping portion 435 of the driven revolver 43, the driven revolver 43 is driven to rotate upward with the first revolver 41, thereby pulling the front- and rear-wheel brake cables FW, RW to move upward, so as to similarly brake the front and rear wheels.

In one possible embodiment, the first revolver 41, the second revolver 42 and the driven revolver 43 each be mounted around the revolving axle 40 through a respective bush 402, so that the distance between the revolvers can be adjusted and the revolvers can rotate against the revolving axle 30 more smoothly and accurately.

To sum up, the disclosed brake-aiding device does have the benefits of enhanced applicability and convenience, and is helpful to improve braking, thus being a novel and inventive creation. The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A brake-aiding device applicable to a two-wheeled vehicle, the brake-aiding device comprising:
   a casing, being a hollow member;
   a drive mechanism, being installed in the casing and comprising a revolving axle transversely provided near a rear end of the casing, and a first revolver, a second revolver, and a driven revolver that all three are configured to rotate against the revolving axle, wherein the first revolver, the second revolver, and the driven revolver each have a rear segment mounted around the revolving axle, so that front segments of the first revolver, the second revolver, and the driven revolver are allowed to move up and down inside the casing within a predetermined range, and wherein
   the driven revolver has at least one propping portion for providing forward or backward stop to the first revolver and the second revolver, so that when any of the first revolver and the second revolver rotates forward or backward, the driven revolver is driven to rotate.

2. The brake-aiding device of claim 1, wherein the first revolver and the second revolver flank the driven revolver, and the driven revolver has the propping portions provided at two lateral sides thereof to provide stop to the first revolver and the second revolver.

3. The brake-aiding device of claim 2, wherein the front segments of the first revolver and the second revolver are for cables of two brake levers of the two-wheeled vehicle to connect, and the front segment of the driven revolver is for cables of front- and rear-wheel brakes of the two-wheeled vehicle to connect.

4. The brake-aiding device of claim 3, wherein a distance between where the driven revolver connects the front-wheel brake cable and the axle is smaller than a distance between where the driven revolver connects the rear-wheel brake cable and the axle.

5. The brake-aiding device of claim 4, wherein the casing has a top and a bottom each provided with two through holes, and the cables of the two brake levers and the cables to the two brakes are connected to the drive mechanism from the top and bottom of the casing through the through holes.

6. The brake-aiding device of claim 4, wherein the driven revolver further comprises two collars and two grooves for positioning the cables.

7. The brake-aiding device of claim 4, wherein the revolving axle is formed by two shafts that are coaxial and pass through two lateral sides of the casing.

8. The brake-aiding device of claim 4, wherein the first revolver, the second revolver, and the driven revolver are mounted around the revolving axle through bushes.

9. The brake-aiding device of claim 4, wherein the casing comprises a casing body and a front cover that are configured to combine with each other.

10. The brake-aiding device of claim 1, wherein the front segments of the first revolver and the second revolver are for cables of two brake levers of the two-wheeled vehicle to connect, and the front segment of the driven revolver is for cables of front- and rear-wheel brakes of the two-wheeled vehicle to connect.

11. The brake-aiding device of claim 10, wherein a distance between where the driven revolver connects the front-wheel brake cable and the axle is smaller than a distance between where the driven revolver connects the rear-wheel brake cable and the axle.

12. The brake-aiding device of claim 11, wherein the casing has a top and a bottom each provided with two through holes, and the cables of the two brake levers and the cables to the two brakes are connected to the drive mechanism from the top and bottom of the casing through the through holes.

13. The brake-aiding device of claim 11, wherein the driven revolver further comprises two collars and two grooves for positioning the cables.

14. The brake-aiding device of claim 11, wherein the revolving axle is formed by two shafts that are coaxial and pass through two lateral sides of the casing.

15. The brake-aiding device of claim 11, wherein the first revolver, the second revolver, and the driven revolver are mounted around the revolving axle through bushes.

16. The brake-aiding device of claim 11, wherein the casing comprises a casing body and a front cover that are configured to combine with each other.

17. The brake-aiding device of claim 1, wherein the first revolver is placed next to the second revolver, and the driven revolver comprises two rotating portions and the propping portion, in which the two rotating portions jointly flank the first revolver and the second revolver, and the propping portion spans the first revolver and the second revolver and connects the two rotating portions.

* * * * *